United States Patent
Kaushik et al.

(10) Patent No.: US 10,970,310 B2
(45) Date of Patent: Apr. 6, 2021

(54) SYNCHRONOUS REPLICATION BASED CUTOVER ENGINE

(71) Applicant: NetApp Inc., Sunnyvale, CA (US)

(72) Inventors: Akhil Kaushik, Bangalore (IN); Balaji Ramani, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 114 days.

(21) Appl. No.: 16/191,582

(22) Filed: Nov. 15, 2018

(65) Prior Publication Data
US 2020/0042536 A1 Feb. 6, 2020

(51) Int. Cl.
*G06F 16/00* (2019.01)
*G06F 16/27* (2019.01)
*G06F 16/11* (2019.01)
*G06F 11/14* (2006.01)
*G06F 16/176* (2019.01)

(52) U.S. Cl.
CPC ........ *G06F 16/275* (2019.01); *G06F 11/1464* (2013.01); *G06F 11/1466* (2013.01); *G06F 16/119* (2019.01); *G06F 16/128* (2019.01); *G06F 16/1774* (2019.01); *G06F 2201/825* (2013.01); *G06F 2201/835* (2013.01)

(58) Field of Classification Search
CPC ............. G06F 11/1466; G06F 11/2094; G06F 16/119; G06F 16/273; G06F 16/275; G06F 3/0617; G06F 3/0647; G06F 16/128; G06F 16/1774; G06F 2201/825; G06F 2201/835; G06F 3/0611; G06F 3/067
USPC ....................................................... 707/610
See application file for complete search history.

(56) References Cited

U.S. PATENT DOCUMENTS

| 7,849,281 | B2 | 12/2010 | Malhotra et al. |
| 8,005,793 | B1 * | 8/2011 | Jernigan, IV ........ G06F 3/0617 |
| | | | 707/639 |
| 8,341,115 | B1 | 12/2012 | Natanzon et al. |
| 9,020,891 | B1 | 4/2015 | Stefani et al. |

(Continued)

FOREIGN PATENT DOCUMENTS

EP 2996025 A1 3/2016

OTHER PUBLICATIONS

Int. Search Report/Written Opinion in International No. PCT/US2019/044591 dated Oct. 16, 2019, 17 pgs.

(Continued)

*Primary Examiner* — Vincent F Boccio
(74) *Attorney, Agent, or Firm* — Cooper Legal Group, LLC

(57) ABSTRACT

Techniques are provided for synchronous replication based cutover. An asynchronous replication process is executed to perform asynchronous incremental transfers of data of a storage object from a first computing environment to a replicated storage object at a second computing environment until a cutover criteria is met. A synchronous replication process is executed to synchronously replicate operations, targeting the storage object, to the replicated storage object based upon the cutover criteria being met. A cutover is performed to direct operations from targeting the storage object to targeting the replicated storage object based upon the synchronous replication process reaching a steady state of synchronous replication for sub-objects of the storage object, where operations are committed to both the storage object and the replicated storage object.

20 Claims, 9 Drawing Sheets

(56) References Cited

U.S. PATENT DOCUMENTS

| | | | |
|---|---|---|---|
| 9,817,606 B1 | 11/2017 | Byrne et al. | |
| 9,959,063 B1* | 5/2018 | Meiri et al. | |
| 10,296,397 B2* | 5/2019 | Richter | G06F 9/5083 |
| 2008/0244035 A1 | 10/2008 | Horie | |
| 2014/0223089 A1 | 8/2014 | Kang et al. | |
| 2015/0378767 A1 | 12/2015 | Tarasuk-Levin et al. | |
| 2017/0249222 A1 | 8/2017 | Patnaik et al. | |
| 2017/0269869 A1* | 9/2017 | Aerts | G06F 3/061 |

OTHER PUBLICATIONS

"CloudNet: Dynamic Pooling of Cloud Resources b Live WAN Migration of Virtual Machines", Aug. 19, 2014, Timothy Wood, Prashant Shenoy, K.K. Ramakrishnan and Jacobus Van Der Merwe; IEEE/ACM Transations on Networking, vol. 23, Issue 5, 12 pgs.

"Easy IBM i migrations with near-zero downtime", www.visionsolutions.com, 2014, pp. 1-2.

"Data Migration: Move Data Faster and Cheaper, with Less Business Disruption", www.cisco.com, 2010.

* cited by examiner

… (1)

SYNCHRONOUS REPLICATION BASED CUTOVER ENGINE

RELATED APPLICATIONS

This application claims priority to India Patent Application, titled "SYNCHRONOUS REPLICATION BASED CUTOVER ENGINE", filed on Aug. 2, 2018 and accorded Indian Application No.: 201841029051, which is incorporated herein by reference.

BACKGROUND

Many storage systems may implement data replication and/or other redundancy data access techniques for data loss protection and non-disruptive client access. For example, a first computing device may be configured to provide clients with primary access to data stored within a first storage device and/or other storage devices. A second computing device may be configured as a backup for the first computing device in the event the first computing device fails. Data may be replicated from the first computing device to the second computing device. In this way, the second computing device can provide clients with access to replicated data in the event the first computing device fails.

Storage virtual machines may be used to manage storage (e.g., a plurality of volumes stored across one or more nodes of a cluster) and provide clients with access to such storage. It may be beneficial to migrate a storage virtual machine from one cluster to another cluster, such as for load balancing. Unfortunately, migrating the storage virtual machine is very disruptive to clients. This is because client access to storage hosted by the storage virtual machine is quiesced (blocked), which increases client I/O latency, can result in applications relying on data within the storage to time out or experience errors, etc.

DETAILED DESCRIPTION

Figure 1:
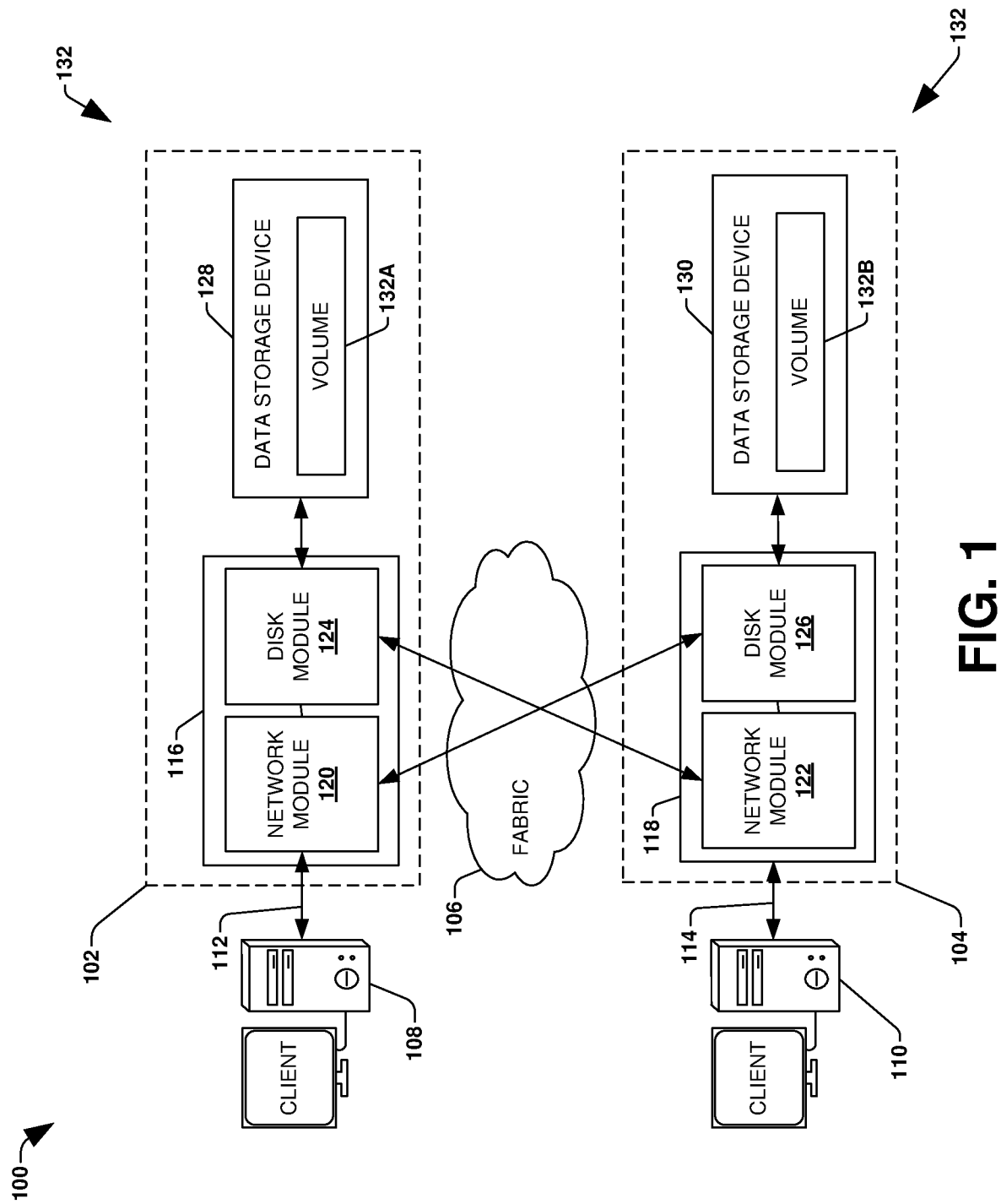
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Many technological processes for migrating storage objects, such as volumes and storage virtual machines, are disruptive to clients. These migration processes may be limited to performing asynchronous transfers of data from a source storage object to a destination storage object. These asynchronous transfers replicate incremental changes to data of the source storage object to the destination storage object. Once the asynchronous transfers are complete, I/O from clients to the source storage object are fenced/quiesced (blocked). This results in significant client latency for applications and computers that reply upon access to the data of the source storage object because I/O is blocked, such as failed or queued for later execution. Thus, clients may experience higher latency due to fencing/quiescing of I/O during a cutover period where clients are cut over from being able to access the source storage object to being able to access the destination storage object. This can cause the applications and computers to time out, crash, or have other operational issues and downtime.

Accordingly, these migration processes are improved by performing non-disruptive migration that reduces the disruptiveness and client latency associated with migrating storage objects. This improvement is achieved by additionally utilizing a synchronous replication process in the migration process. Using synchronous replication has the advantage of keeping client experienced latency to a significantly lower number. Also, synchronous replication is used to achieve a successful non-disruptive migration of a storage virtual machine that is a collection of volumes.

In an embodiment, an asynchronous replication process is performed to asynchronously replicate incremental changes to data of a storage object to a replicated storage object. For example, changes to data within volumes of a storage virtual machine stored across a plurality of nodes of a first cluster are asynchronously replicated to replicated volumes of a replicated storage virtual machine at a second cluster. This is done as part of a non-disruptive migration process to migrate the storage virtual machine from the first cluster to the second cluster, such as to improve performance or to more efficiently utilize storage capacity (e.g., the second cluster may have more available storage resources and/or processing resources).

The asynchronous incremental transfers are performed until a cutover criteria is met. The cutover criteria can be defined as a set amount of time or a certain amount of data remaining to be replicated. Accordingly, a synchronous replication process is executed in response to the cutover criteria being met. The synchronous replication process is executed to synchronously replicate operations targeting the storage object. The operations are executed upon the storage object and are replicated to create replicated operations that are transmitted to the second cluster for execution upon the replicated storage object. In response to receiving an acknowledgment message from the second cluster that the replicated operation was received, an acknowledgement of successfully completion of the operation is returned to a client computing device that generated the operation.

Transmission of the acknowledgement message is based upon receipt of the replicated operation by the second cluster for subsequent execution upon the replicated storage object and not commitment of the replicated operation, and thus the client computing device experiences low latency. Otherwise, the client computing device would experience higher latency because the acknowledgement message of success would not be sent to the client computing device until after the replicated operation is committed. This also allows the second cluster to queue replicated operations so that the replicated operations can be committed to storage in a manner that guarantees dependent write order consistency of what order the first cluster executed corresponding operations. For example, a first write operation writes data A to the storage object and a second write operation overwrites data A with data B. If the second cluster executes a replication of the second write operation before a replication of the first write operation, then data inconsistency will results because the second cluster will now store data A while the first cluster stores data B.

Once all sub-objects of the storage object (e.g., each volume of the storage virtual machine) are in a steady state of synchronous replication with the replicated storage object (e.g., operations and replicated operations are being committed to storage), a cutover phase is performed. The cutover phase is performed to switch clients from accessing the storage object to accessing the replicated storage object. A cutover window of the cutover phase where client I/O is quiesced is shorter than convention migration techniques because cutover can be quickly performed since the storage object and the replicated storage object are in a steady synchronous state so less time is spent synchronizing any remaining data. Even though both copies are synchronized (the storage object and the replicated storage object are in sync), there are latency improvements/benefits because there are merely a few pending I/Os on the replicated storage object (the secondary copy) that will have to be drained during the cutover phase. During the cutover phase, these I/Os are drained, and thus this is the only time period where I/O is quiesced because synchronous replication was used as an underlying engine for migration.

During the cutover phase, client I/O is quiesced, and a final drain is performed to complete any pending in-flight operations and replicated operations (e.g., inflight operations comprising operations not committed yet to both the storage object and the replicated storage object). Any additional filesystem metadata, such as network file system (NFS) lock data, a replay cache for non-idempotent operations, etc., is transferred to the second cluster. Once complete, clients are redirected to the replicated storage object. In contrast, existing migration techniques would have to perform additional data replication in order to place the storage object and the replicated storage object in a consistent state. This increases client latency and adversely affects throughput for clients. Accordingly, synchronous replication is performed before cutover in order to reduce latency and improve client throughput because the time client I/O is quiesced is reduced due to having little to no additional data to replicate (e.g., merely in-flight operations need to be drained and filesystem metadata need to be copied over).

This non-disruptive migration technique also provides other improvements over existing migration techniques. For example, existing migration techniques may be unable to migrate more than a single volume between clusters in a predictable manner. In contrast, this non-disruptive migration technique can migrate a storage virtual volume of a plurality of volumes stored across multiple nodes in a predictable manner. Even though each volume is independent of one another and could have different change rates of data, migration is performed in a predictable manner because synchronous replication places the storage volumes and replicated storage volumes in steady state of synchronous replication before cutover. This also allows for a more relaxed cutover criteria to be specified. Otherwise, existing migration techniques, using merely asynchronous replication, must comply with stringent cutover criteria that can result in failed cutover attempts that do not complete within a time limit set by such stringent cutover criteria.

To provide for non-disruptive migration, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that replay of metadata and data operations may be implemented within the clustered network environment 100. In an example, operations may be executed at node 116 and replayed at node 118. It may be appreciated that replay of metadata and data operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
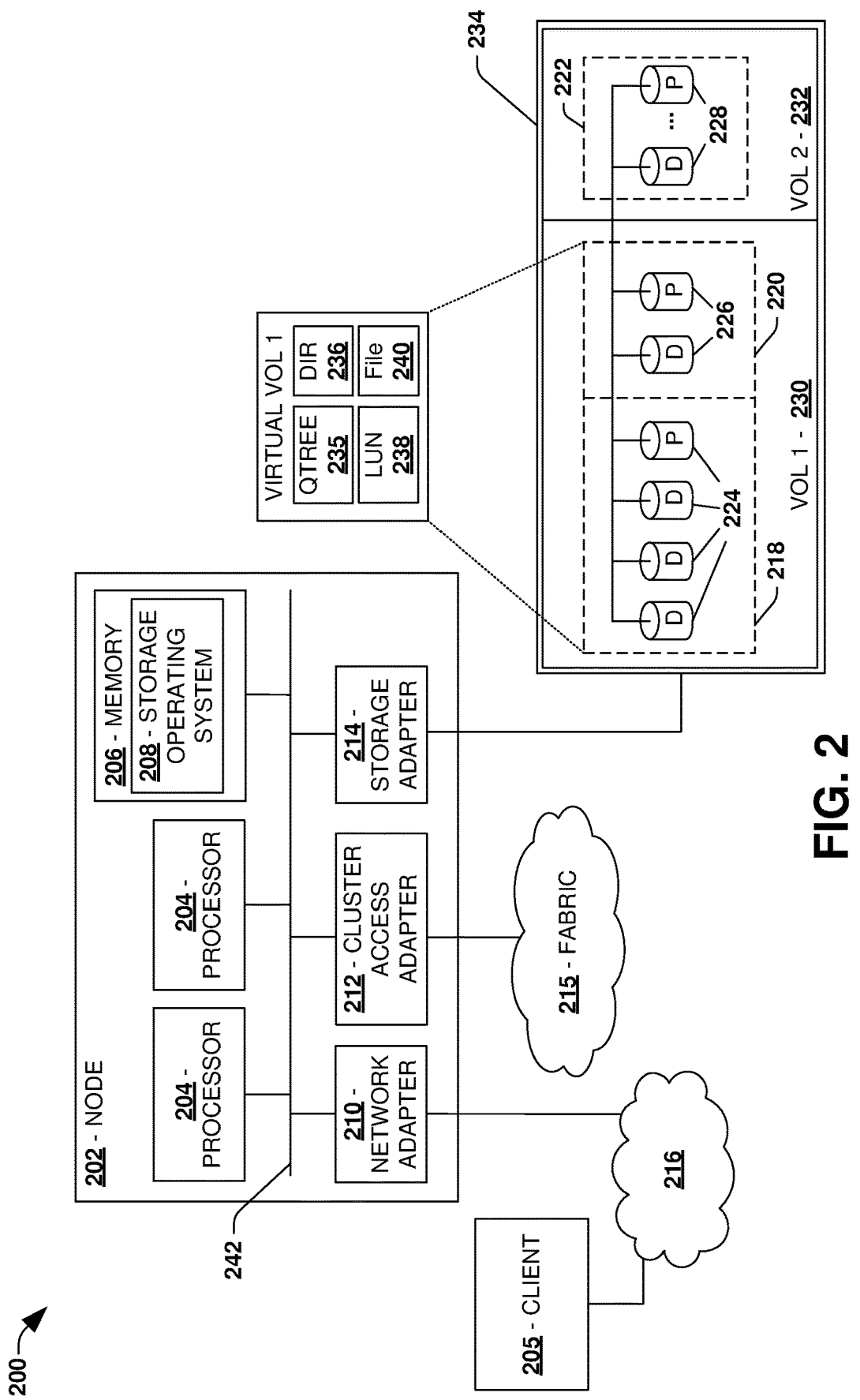
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that replay of metadata and data operations may be implemented for the data storage system 200. In an example, the node 202 may execute operation upon an NVRAM and replay the operations to flush the NVRAM to storage. It may be appreciated that replay of metadata and data operations may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
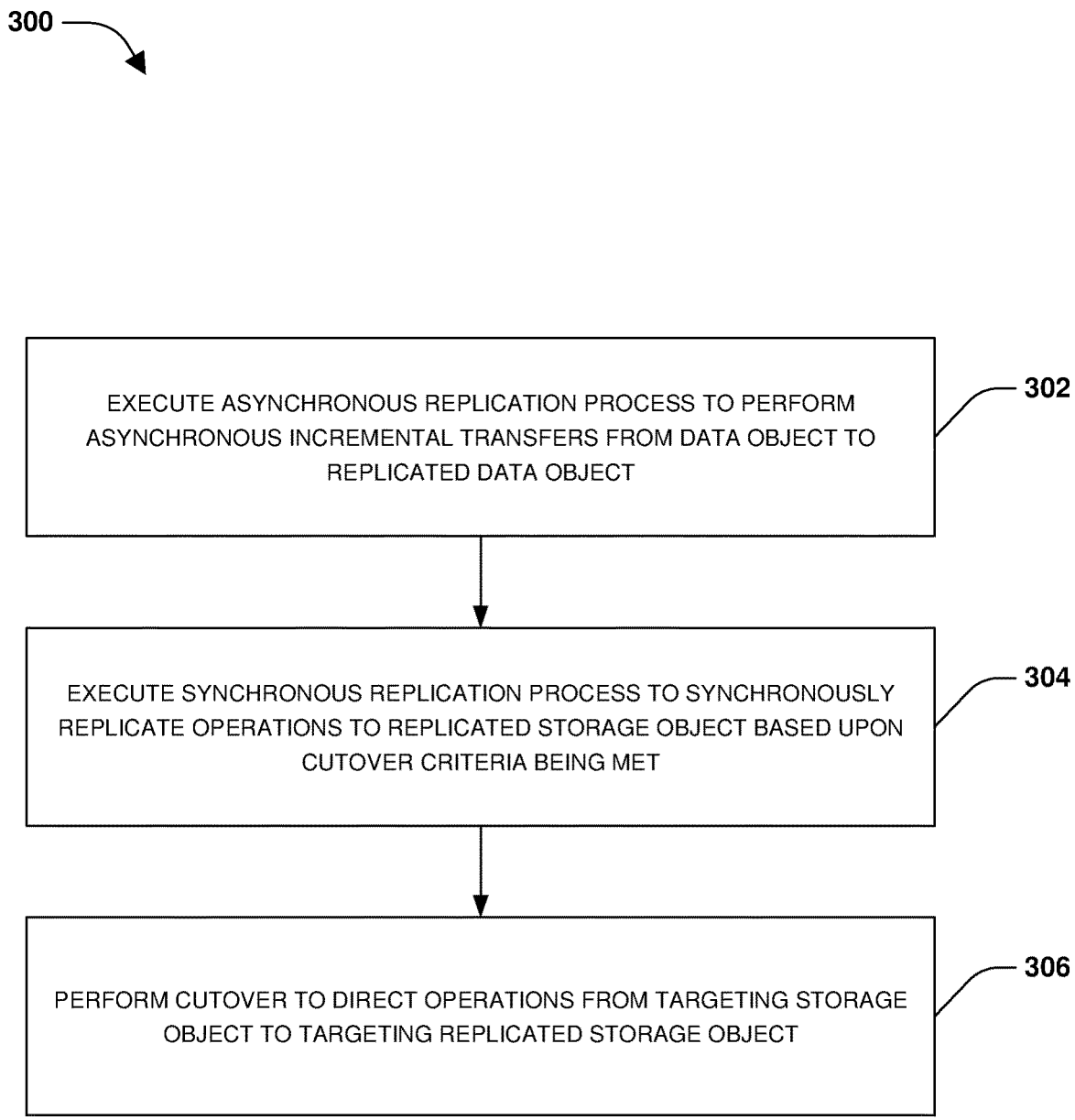
FIG. 3 is a flow chart illustrating an example method for synchronous replication based cutover.
Figure 4A:
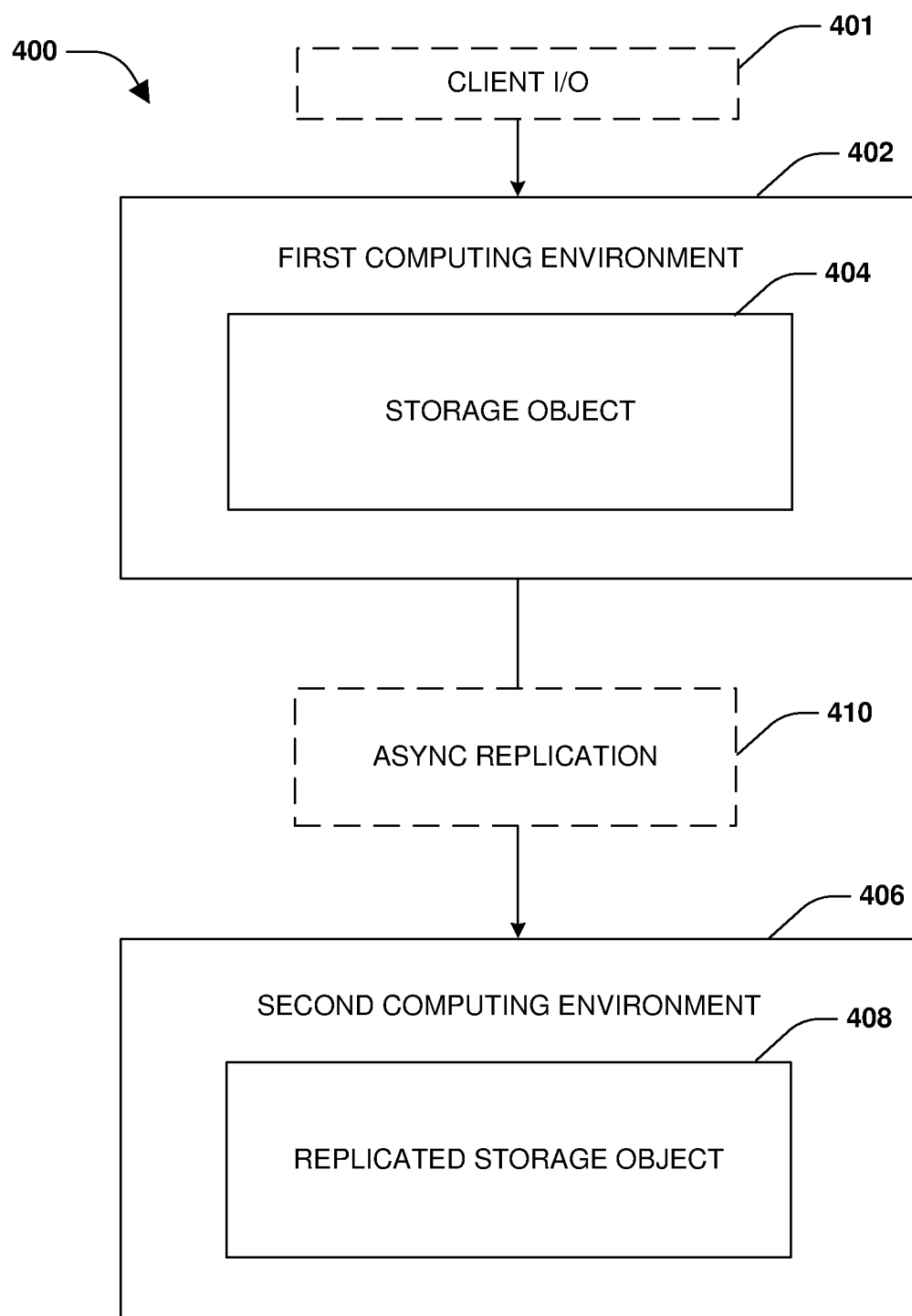
FIG. 4A is a component block diagram illustrating an example system for synchronous replication based cutover, where asynchronous replication is performed.

One embodiment of a synchronous replication based cutover engine is illustrated by an exemplary method 300 of FIG. 3 and further described in conjunction with system 400 of FIGS. 4A-4D. A first computing environment 402 comprises a storage object 404, such as a file, a directory, a volume, a storage virtual machine, etc., as illustrated by FIG. 4A. In an embodiment, the storage object 404 may comprise a storage virtual machine of a plurality of volumes storage across multiple nodes of a first cluster. A second computing environment 406 may maintain a replicated storage object 408 as a replication of the storage object 404. The replicated storage object 408 may comprise a replicated virtual machine of a plurality of replicated volumes stored across multiple nodes of a second cluster. A replication process may be used to replicate data within the storage object 404 and to replicate operations such as data operations and metadata operations (e.g., write/modify operations) directed to the storage object 404 to the replicated storage object 408.

A determination may be made that the storage object 404 should be migrated to the second computing environment 406 as the replicated storage object 408. In an embodiment, as part of migration, the replicated storage object 408 is created within the second computing environment 406 and the replication process is performed to replicate data into the replicated storage object 408. In an embodiment, the determination may be made based upon receiving a migration command. In an embodiment, performance statistics of the first computing environment 402 are evaluated against a performance criteria to determine that the migration should be performed based upon the performance statistics not satisfying the performance criteria. In an embodiment, storage capacity statistics of the first computing environment 402 are evaluated against a storage capacity criteria to determine that the migration should be performed based upon the storage capacity statistics not satisfying the storage capacity criteria. In this way, the replication process is performed to migrate the storage object 404 to the second computing environment 406 as the replicated storage object 408.

At 302, an asynchronous replication process 410 is executed to perform asynchronous incremental transfers of data of the storage object 404 from the first computing environment 402 to the replicated storage object 408 until a cutover criteria is met, as illustrated by FIG. 4A. In an embodiment, the cutover criteria can be defined as a timespan for performing asynchronous replication (e.g., the cutover criteria corresponds to a 3 minute timespan during which asynchronous replication is to be performed). In an embodiment, the cutover criteria can be defined as an amount of data remaining to be replicated (e.g., the cutover criteria corresponds to a remaining percentage of data to be replicated such as 5% or a remaining size of data to be replicated such as 50 megabytes).

Figure 4B:
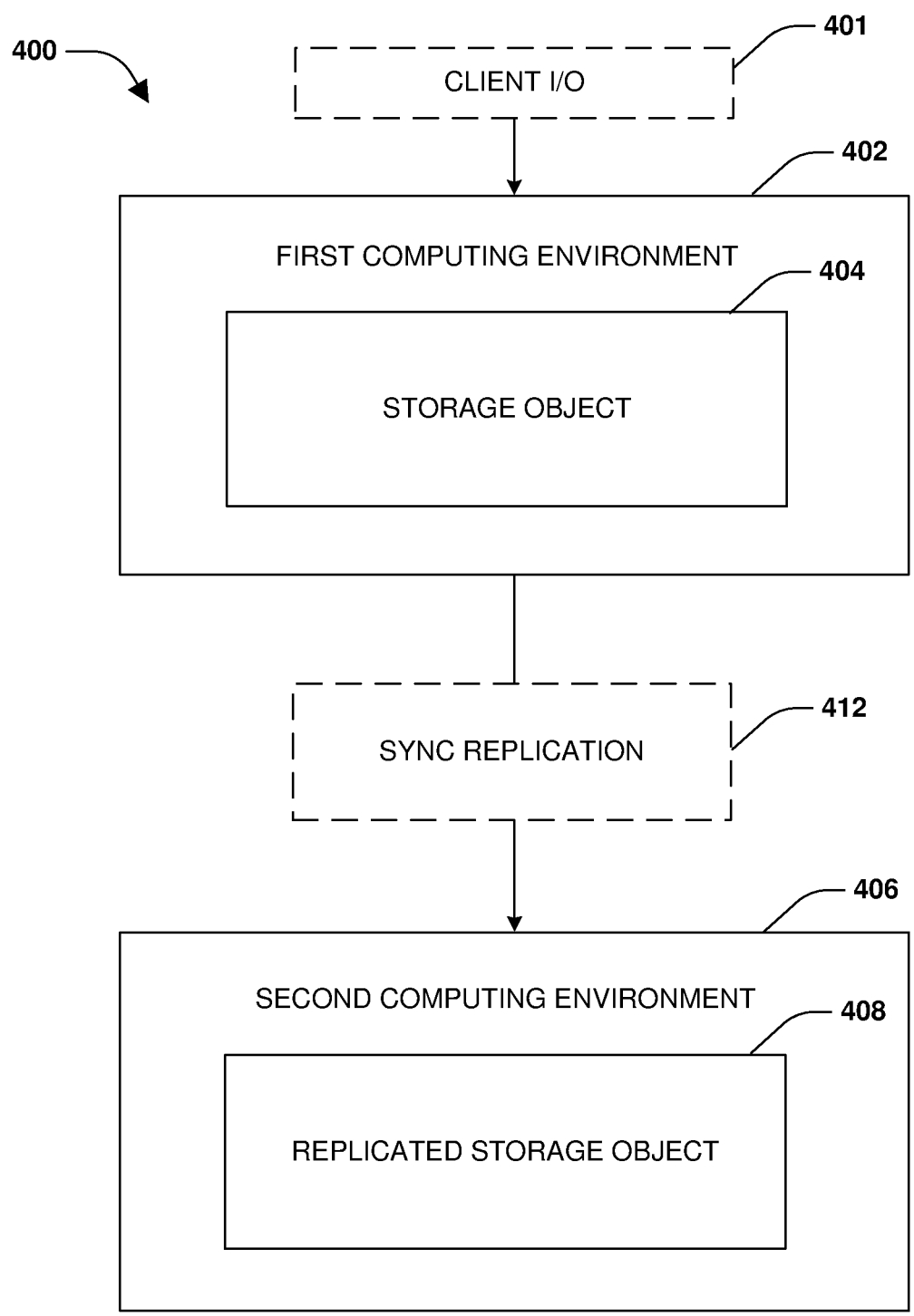
FIG. 4B is a component block diagram illustrating an example system for synchronous replication based cutover, where synchronous replication is performed.

At 304, a synchronous replication process 412 is executed to synchronously replicate operations (e.g., data operations, metadata operations, write operations, etc.), targeting the storage object 404, to the replicated storage object 408 based upon the cutover criteria having been met, as illustrated by FIG. 4B. With synchronous replication, a client that submitted an operation to the first computing environment 402 for execution upon the storage object 404 is not acknowledged as the operation being successful until both the operation and a replicated operation of the operation are acknowledged (e.g., the operation being committed to the storage object 404 and the second computing environment 406 acknowledging receipt of the replicated operation for commitment upon the replicated storage object 408).

In an embodiment of the replication process, operations (e.g., write operations) are executed upon the storage object 404 before being transmitted as replicated operations to the second computing environment 406 for execution upon the replicated storage object 408. The operations may be executed according to a defined ordering. Thus, the replicated operations are assigned sequence numbers based upon the order of execution. The sequence numbers are used by the second computing environment 406 to enforce the execution of the replicated operations upon the replicated storage object 408 according to the defined ordering. In particular, the second computing environment 406 may transmit messages acknowledging receipt of the replicated operations so that the first computing environment 402 can acknowledge to the client that the operations are successful upon commitment to the storage object 404. The second computing environment 406 may queue the replicated operations into a queue. The second computing environment 406 may sort/order the replicated operations based upon assigned sequence numbers so that the sorted replicated operations correspond to an order of execution by the first computing environment 402. In this way, the second computing environment 406 can execute the replicated operations upon the replicated storage object 408 according to a similar order of execution.

Figure 4C:
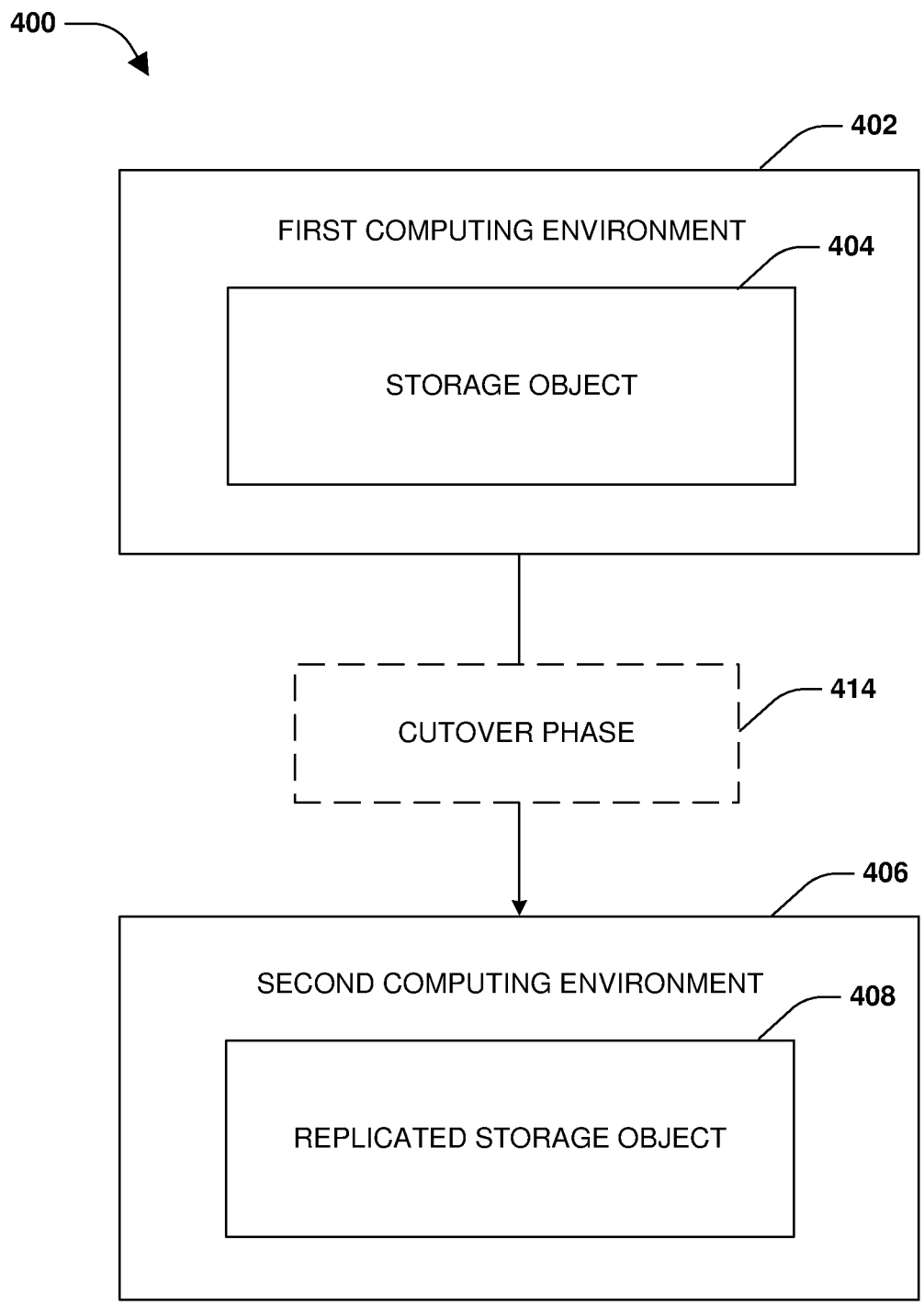
FIG. 4C is a component block diagram illustrating an example system for synchronous replication based cutover, where a cutover phase is performed.
Figure 4D:
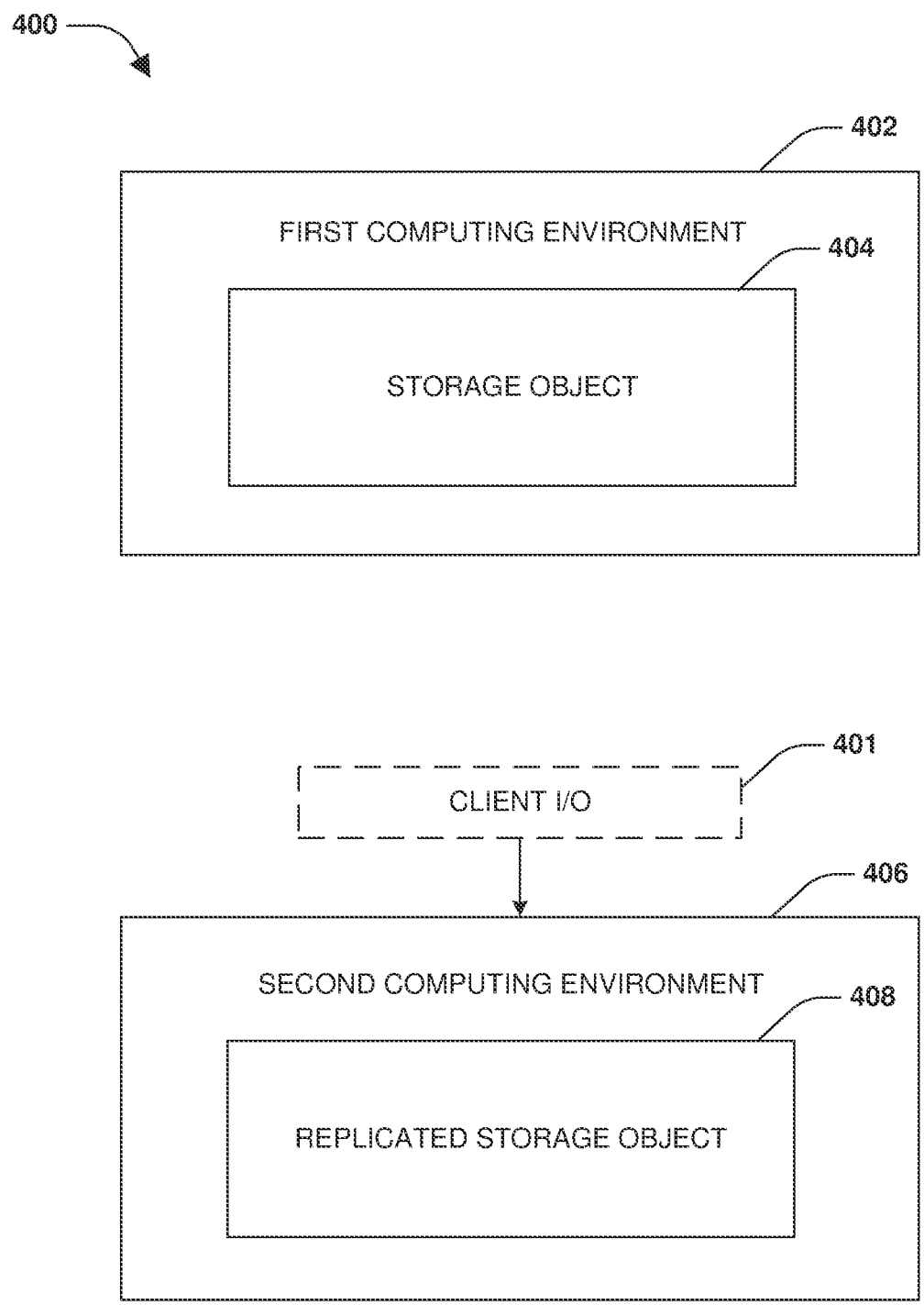
FIG. 4D is a component block diagram illustrating an example system for synchronous replication based cutover, where client access is cut over to a replicated storage object.

At 306, a cutover 414 is performed to direct operations (e.g., write and read requests) from targeting the storage object 404 to targeting the replicated storage object 408 upon completion of the cutover 414, as illustrated by FIGS. 4C and 4D. The cutover 414 is performed based upon the synchronous replication process reaching a steady state of synchronous replication for sub-objects of the storage object 404 (e.g., files, directories, data blocks, or other sub-objects of a volume or a plurality of volumes of a storage virtual machine). The steady state is where operations are committed to both the storage object 404 and the replicated storage object 408.

In an embodiment of the cutover 414, an application, creating the operations, is quiesced to pause the application from generating operations targeting the storage object 404. A drain operation is performed to complete pending operations not yet committed to storage (e.g., inflight operations, such as replicated operations not yet committed to the replicated storage object 408 by the second computing environment). Protocol specific information, such as network file system lock data and a replay cache of non-idempotent operations, is replicated to the replicated storage object 408. Because the storage object 404 and the replicated storage object 408 as in sync from the synchronous replication process, there is a relatively small number of operations to drain (complete), and thus a time period during which I/O from the application is quiesced is short.

Once the cutover 414 is complete, the application and/or other remote devices are now switched over to accessing the replicated storage object 408 instead of the storage object 404. In this way, the client I/O 401 is redirected to the replicated storage object 408 at the second computing environment 406. If a failure to migrate the storage object 404 occurs, then a snapshot created by a last asynchronous incremental transfer is used to perform a rollback of the replicated storage object 408 to a state when the last asynchronous incremental transfer was performed. That is, the snapshot is used to modify the replicated storage object 408 to comprise data that the replicated storage object 408 comprised after the last asynchronous incremental transfer was performed for the replicated storage object 408.

In an embodiment, a timestamp matching process is performed to match timestamps of filesystem modification operations to metadata of the first computing environment 402 and the second computing environment 406. In an embodiment of the timestamp matching process, synchronous replication processes incoming operations in a sequential manner (e.g., operations are processed on a primary storage object first and are then replicated to a secondary storage object).

A primary filesystem, as part of processing the operation, will modify various timestamps pertaining to the storage object (e.g., an inode) such as mtime (a modification time), ctime (a status change time) and crtime (a creation time). As a response to the operation, synchronous replication will obtain the modified timestamp (mtime). The synchronous replication will replicate the modified timestamp to the secondary storage object. This works fine when operations are processed in serial fashion, such as where each operation is written to the primary storage object first and is then written to the secondary storage object. But this may not be used as the mode of operation due to performance considerations hence data operations are processed in parallel (e.g., multiple write operations can be executed in parallel albeit in sequential manner). Since the order of operations is not maintained at the second computing environment 406, the order of operations being executed upon the primary storage object and the secondary storage object can be different. This can result in timestamps not matching between the primary storage object and the secondary storage. A way to fix this inconsistency is to teach the filesystem to not modify timestamp when the current timestamp on an inode is already higher than the current operation's timestamp.

In an embodiment, a method comprises performing a timestamp matching process to match timestamps of filesystem modification operations to metadata of the first computing environment 402 and the second computing environment 406. In an embodiment, the method comprises evaluating performance statistics of the first computing environment 402 against a performance criteria to determine that the storage object 404 is to be migrated to the second computing environment 406 as the replicated storage object 408 based upon the performance statistics being less than the performance criteria. In an embodiment, the method comprises evaluating storage capacity statistics of the first computing environment 402 against a capacity criteria to determine that the storage object 404 is to be migrated to the second computing environment 406 as the replicated storage object 408 based upon the storage capacity statistics being less than the capacity criteria.

In an embodiment, the method comprise executing operations upon the storage object 404 before transmitting replicated operations of the operations to the second computing environment 406 for execution upon the replicated storage object 408 and comprises executing the operations according to a defined ordering and assigning sequence numbers to the replicated operations for enforcement by the second computing environment 406 for executing the replicated operations according the defined ordering based upon the sequence numbers. In an embodiment, the method comprises performing a rollback of the replicated storage object 408 using a snapshot created by a last asynchronous incremental transfer based upon detecting a failure to migrate the storage object to the second computing environment 406 as the replicated storage object 408.

Figure 5:
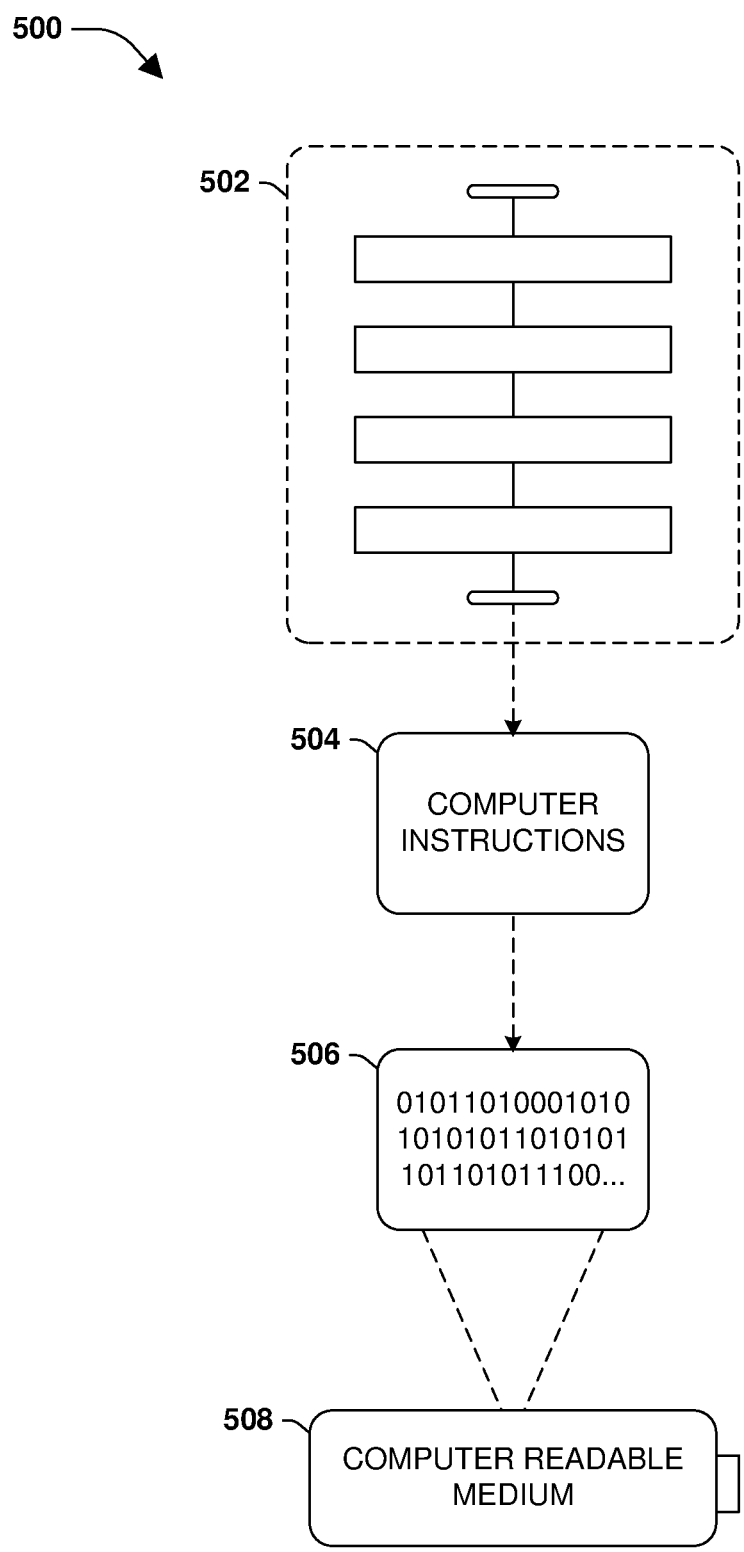
FIG. 5 is an example of a computer readable medium in which an embodiment of the invention may be implemented.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4D, for example. Many such computer-readable media are contemplated to operate in accordance with the techniques presented herein.

Figure 6:
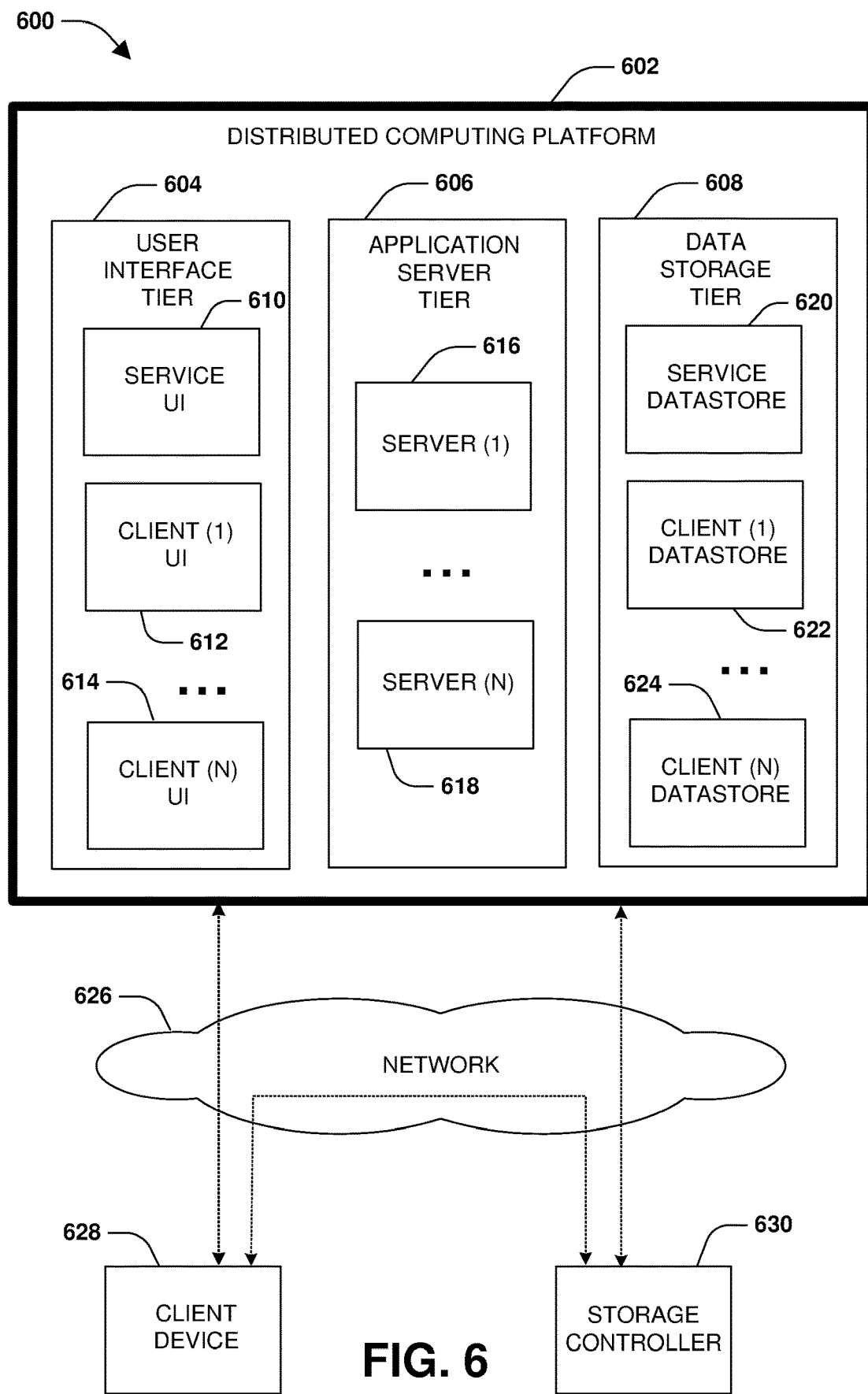
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   executing an asynchronous replication process to perform asynchronous incremental transfers of data of a storage object from a first computing environment to a replicated storage object at a second computing environment until a cutover criteria is met;
   executing a synchronous replication process to synchronously replicate operations, targeting the storage object, to the replicated storage object based upon the cutover criteria being met, wherein the synchronous replication process executes an operation upon the storage object and a replica of the operation upon the replicated storage object before acknowledging the operation as complete; and
   performing a cutover to direct operations from targeting the storage object to targeting the replicated storage object based upon the synchronous replication process reaching a steady state of synchronous replication for sub-objects of the storage object where operations are committed to both the storage object and the replicated storage object.

2. The method of claim 1, wherein the cutover is performed at a predicted entry point based upon the cutover criteria being met by the synchronous replication process.

3. The method of claim 1, comprising:
   defining the cutover criteria as a timespan for performing asynchronous replication.

4. The method of claim 1, comprising:
   defining the cutover criteria as an amount of data remaining to be replicated.

5. The method of claim 1, wherein the performing the cutover comprises:
   quiescing an application to pause the application from generating operations targeting the storage object, and wherein a drain operation is performed to complete pending operations not yet committed to storage.

6. The method of claim 1, wherein the performing the cutover comprises:
   replicating protocol specific information to the replicated storage object, wherein the protocol specific information corresponds to network file system lock data and replay cache of non-idempotent operations.

7. The method of claim 1, wherein replicated operations targeting the replicated storage object are terminated upon the second computing environment receiving the replicated operations, wherein the replicated operations are committed by the second computing environment as a background process.

8. The method of claim 1, wherein the storage object comprises a plurality of volumes of a storage virtual machine, and the asynchronous replication process, the synchronous replication process, and the cutover are performed as a non-disruptive migration of the storage virtual machine, wherein latency of client access to the storage virtual machine is reduced based upon performing the synchronous replication process.

9. The method of claim 1, wherein the storage object comprises a storage virtual machine of a plurality of volumes stored across multiple nodes of a first cluster and the replicated storage object comprises a replicated virtual machine of a plurality of replicated volumes stored across multiple nodes of a second cluster, wherein the asynchronous replication process, the synchronous replication process, and the cutover are performed as a non-disruptive migration of the storage virtual machine, wherein latency of client access to the storage virtual machine is reduced based upon performing the synchronous replication process.

10. The method of claim 9, wherein the asynchronous replication process and the synchronous replication process replicate data and operations, associated with the plurality of volumes, to the plurality of replicated volumes.

11. The method of claim 9, wherein the synchronous replication process synchronously replicates data operations and metadata operations.

12. The method of claim 1, comprising:
performing a timestamp matching process to match timestamps of filesystem modification operations to metadata of the first computing environment and the second computing environment.

13. The method of claim 1, comprising:
evaluating performance statistics of the first computing environment against a performance criteria to determine that the storage object is to be migrated to the second computing environment as the replicated storage object based upon the performance statistics being less than the performance criteria.

14. The method of claim 1, comprising:
evaluating storage capacity statistics of the first computing environment against a capacity criteria to determine that the storage object is to be migrated to the second computing environment as the replicated storage object based upon the storage capacity statistics being less than the capacity criteria.

15. The method of claim 1, comprising:
executing operations upon the storage object before transmitting replicated operations of the operations to the second computing environment for execution upon the replicated storage object.

16. The method of claim 15, comprising:
executing the operations according to a defined ordering and assigning sequence numbers to the replicated operations for enforcement by the second computing environment for executing the replicated operations according the defined ordering based upon the sequence numbers.

17. The method of claim 1, comprising:
performing a rollback of the replicated storage object using a snapshot created by a last asynchronous incremental transfer based upon detecting a failure to migrate the storage object to the second computing environment as the replicated storage object, wherein the rollback is performed as an error handling process based upon a failure during at least one of the synchronous replication process and the cutover.

18. The method of claim 1, wherein the storage object comprises a plurality of volumes of a storage virtual machine, and wherein file system consistency is maintained during the asynchronous replication process, the synchronous replication process, and the cutover and eventual consistency is provided for dependent write order consistency across the plurality of volumes of the storage virtual machine.

19. A non-transitory machine readable medium comprising instructions for performing a method, which when executed by a machine, causes the machine to:
execute an asynchronous replication process to perform asynchronous incremental transfers of data of a storage object from a first computing environment to a replicated storage object at a second computing environment until a cutover criteria is met;
execute a synchronous replication process to synchronously replicate operations, targeting the storage object, to the replicated storage object based upon the cutover criteria being met, wherein the synchronous replication process executes an operation upon the storage object and a replica of the operation upon the replicated storage object before acknowledging the operation as complete; and
perform a cutover to direct operations from targeting the storage object to targeting the replicated storage object based upon the synchronous replication process reaching a steady state of synchronous replication for sub-objects of the storage object where operations are committed to both the storage object and the replicated storage object.

20. A computing device comprising:
a memory comprising machine executable code for performing a method; and
a processor coupled to the memory, the processor configured to execute the machine executable code to cause the processor to:
execute an asynchronous replication process to perform asynchronous incremental transfers of data of a storage object from a first computing environment to a replicated storage object at a second computing environment until a cutover criteria is met;
execute a synchronous replication process to synchronously replicate operations, targeting the storage object, to the replicated storage object based upon the cutover criteria being met, wherein the synchronous replication process executes an operation upon the storage object and a replica of the operation upon the replicated storage object before acknowledging the operation as complete; and
perform a cutover to direct operations from targeting the storage object to targeting the replicated storage object based upon the synchronous replication process reaching a steady state of synchronous replication for sub-objects of the storage object where operations are committed to both the storage object and the replicated storage object.

* * * * *